(12) United States Patent
Talan et al.

(10) Patent No.: US 7,899,757 B1
(45) Date of Patent: Mar. 1, 2011

(54) MECHANISM FOR INDICATING AND RESOLVING THE TRUST LEVEL OF INFORMATION

(75) Inventors: Jonathan M. Talan, Frisco, TX (US); James A. Slattery, McKinney, TX (US); Jefrey O. Pfeiffer, Lewisville, TX (US)

(73) Assignee: Intuit Inc., Mountain View, CA (US)

( * ) Notice: Subject to any disclaimer, the term of this patent is extended or adjusted under 35 U.S.C. 154(b) by 925 days.

(21) Appl. No.: 11/700,580

(22) Filed: Jan. 30, 2007

(51) Int. Cl.
*G06Q 10/00* (2006.01)

(52) U.S. Cl. .......................................... 705/319; 705/30
(58) Field of Classification Search ........................ 705/1
See application file for complete search history.

(56) References Cited

U.S. PATENT DOCUMENTS

| | | | | |
|---|---|---|---|---|
| 2002/0111888 A1* | 8/2002 | Stanley et al. | .................. | 705/31 |
| 2003/0063072 A1 | 4/2003 | Brandenberg et al. | | |
| 2004/0064335 A1* | 4/2004 | Yang | .................. | 705/1 |
| 2005/0256866 A1* | 11/2005 | Lu et al. | .......................... | 707/5 |
| 2007/0078845 A1 | 4/2007 | Scott et al. | | |
| 2007/0106577 A1* | 5/2007 | Kopp et al. | ...................... | 705/35 |
| 2007/0255574 A1 | 11/2007 | Polo-Malouvier et al. | | |

OTHER PUBLICATIONS

Fujimura, Ko, Nishihara, Takuo, "Reputation Rating System Based on Past Behavior of Evaluators", NTT Information Sharing and Platform Laboratories, EC '03, Jun. 9-12, 2003, 4 pages.
"Mail Cruncher", Mail Cruncher Press, http://mailcruncher.com/press.cfm, Jan. 1, 2007, 5 pages.
Baum, Dan, "How to Manage Paper Forms along with Electronic Forms Processing", Today, Boston, Aug. 2005, 4 pages.

* cited by examiner

*Primary Examiner* — John G Weiss
*Assistant Examiner* — Gabrielle McCormick
(74) *Attorney, Agent, or Firm* — Osha • Liang LLP

(57) ABSTRACT

The invention relates to a method for managing trust level of a collection of information having a first input data and a derived data. The method involves obtaining the first input data from a data source, generating the derived data from at least the first input data, determining a derived trust level of the derived data from at least a first input trust level based on the data source, and indicating validity of the derived data based on the derived trust level.

30 Claims, 6 Drawing Sheets

Figure 1

| | | |
|---|---|---|
| A Effective date of S election | 3/03/1990 | |
| B Business activity code number (see instructions) | 212110 | |

100 Graphical user interface form

National Association of Computerized Tax
DBA >>>>>>>>>>>>>>>>>>>>>>>>>>>>>>>>>>>>>>x
30 Willow St
Murphy, NC 28906

C Employer identification number: 111444889
D Date incorporated: 2/02/1990
E Total assets (see instructions): $ 994,203.   ← 101 Input data F Check if: (1) ☐ Initial return  (2) ☐ Final return  (3) ☐ Name change  (4) ☐ Address change  (5) ☐ Amended return
G Enter the number of shareholders in the corporation at the end of the tax year ........ 7
H Check if Schedule M-3 is required (attach Schedule M-3) ☐

Caution. *Include only trade or business income and expenses on lines 1a through 21. See the instructions for more information.*

| | | |
|---|---|---|
| 1a Gross receipts or sales.... b Less returns and allowances.. c Bal ▶ | 1c | 12,748.   ← 103 Derived data |
| 2 Cost of goods sold (Schedule A, line 8)........ | 2 | 12,748.   ← 105 Input data |
| 3 Gross profit. Subtract line 2 from line 1c........ | 3 | -12,748.   ← 107 Input data |
| 4 Net gain (loss) from Form 4797, Part II, line 17 (attach Form 4797)........ | 4 | |
| 5 Other income (loss) (attach statement).........See Statement 1 | 5 | 84,103.   ← 109 Input data |
| 6 Total income (loss). Add lines 3 through 5........ ▶ | 6 | 71,355.   ← 111 Derived data |
| 7 Compensation of officers........ | 7 | |
| 8 Salaries and wages (less employment credits)........ | 8 | |
| 9 Repairs and maintenance........ | 9 | |
| 10 Bad debts........ | 10 | |
| 11 Rents........ | 11 | |
| 12 Taxes and licenses........ | 12 | 10,800. |
| 13 Interest........ | 13 | |
| 14 Depreciation not claimed on Schedule A or elsewhere on return (attach Form 4562)........ | 14 | 32,096. |
| 15 Depletion (Do not deduct oil and gas depletion.)........ | 15 | |
| 16 Advertising........ | 16 | |
| 17 Pension, profit-sharing, etc, plans........ | 17 | |

300 Graphical user interface form

"Semi-trusted" annotation 301

"Untrusted" annotation 302

"Untrusted" annotation 303

305 "Trusted" annotation
307 "Semi-trusted" annotation
309 "Trusted" annotation
319 Derived data
321 Derived data
311 "Semi-trusted" annotation
323 Input data
325 Derived data
313 "Trusted" annotation
315 "Semi-trusted" annotation
317 "Untrusted" annotation

| | | |
|---|---|---|
| A | Effective date of S election | 3/03/1990 |
| B | Business activity code number (see instructions) | 212110 |
| | Use the IRS label. Otherwise, print or type. | National Association of Computerized Tax DBA >>>>>>>>>>>>>>>>>>>>>>>>>>>>x 30 Willow St Murphy, NC 28906 |
| C | Employer identification number | 111444889 |
| D | Date incorporated | 2/02/1990 |
| E | Total assets (see instructions) | $ 994,203. |

F Check if: (1) ☐ Initial return  (2) ☐ Final return  (3) ☐ Name change  (4) ☐ Address change  (5) ☐ Amended return
G Enter the number of shareholders in the corporation at the end of the tax year .....
H Check if Schedule M-3 is required (attach Schedule M-3)

Caution. *Include only trade or business income and expenses on lines 1a through 21. See the instructions for more information.*

| | | | |
|---|---|---|---|
| 1a | Gross receipts or sales ..... | b Less returns and allowances ..... | c Bal ▶ 1c |
| 2 | Cost of goods sold (Schedule A, line 8) ..... | | 2  12,748. |
| 3 | Gross profit. Subtract line 2 from line 1c ..... | | 3  12,748. |
| 4 | Net gain (loss) from Form 4797, Part II, line 17 (attach Form 4797) ..... | | 4  0. |
| 5 | Other income (loss) (attach statement) ..... See Statement 1 | | 5  84,102. |
| 6 | Total income (loss). Add lines 3 through 5 ..... | | 6  71,355. |
| 7 | Compensation of officers ..... | | 7 |
| 8 | Salaries and wages (less employment credits) ..... | | 8 |
| 9 | Repairs and maintenance ..... | | 9 |
| 10 | Bad debts ..... | | 10 |
| 11 | Rents ..... | | 11 |
| 12 | Taxes and licenses ..... | | 12  10,800. |
| 13 | Interest ..... | | 13 |
| 14 | Depreciation not claimed on Schedule A or elsewhere on return (attach Form 4562) ..... | | 14 |
| 15 | Depletion (Do not deduct oil and gas depletion.) ..... | | 15  32,096. |
| 16 | Advertising ..... | | 16 |
| 17 | Pension, profit-sharing, etc, plans ..... | | 17 |

Figure 3

MECHANISM FOR INDICATING AND RESOLVING THE TRUST LEVEL OF INFORMATION

BACKGROUND

Every year millions of people use software for various purposes, e.g., keeping track of personal finances, managing projects, processing medical claims, managing corporate accounting and financial information, filing required documents with the government, tax planning, inventory management, business operation (strategic planning, sales forecasting, distribution channel management, and the like) management and the like. Many software applications are form-based in that the applications offer the ability to perform data entry, edit, and review via multiple forms associated with a common task. Specifically, software applications present multiple forms and collect inputs from a user through a user interface, such as a graphical user interface (GUI). In addition, form-based software applications may produce multiple output forms, or documents, based on the collected input data and certain algorithm embedded in the software application, commonly referred to as a generation engine or a calculation engine.

Using electronic forms, the user can easily amend forms by entering data and subsequently editing the data while maintaining clarity of the input and output. Further, a reviewer can review the prepared forms and annotate review comments and/or make appropriate changes. Form-based applications may also be used in various subject areas, such as project planning, resource management, medicine, or any other subject area where forms provide utility.

Generally, the data-containing fields, or data fields, in each of the forms may relate to various pieces of information and must be prepared (i.e., entered, imported, or derived) carefully. For example, in tax preparation software, a person who marries within a tax year may or may not file a joint tax return with his/her spouse depending on current government regulations. As another example, a regulation passed may allow a taxpayer to claim both state and local tax deductions for sales or income tax. In addition, the regulation may specify that tax for motor vehicles may be added to the deduction, but only at a general sales tax rate. To comply with the regulations passed by all governing bodies, the person entering the data must be aware of up-to-date regulations. In other examples, the collection of user inputs, or data entry, may not be performed by a person, e.g., the data may be imported from another software application. For example, an inventory management software application may import data from a point of sale software. In another example, corporate tax preparation software may import data from an accounting software application of a separate financial institution.

Users of software applications, e.g., financial software, must be able to trust the quality of the data source behind the multiple forms presented by the software. Regardless of whether the data fields contain data inputted directly or derived from other data, a reviewer must have a means of determining the original data source, or sources, and assessing a level of trust, i.e., trust level, before the reviewer can determine the validity (e.g., correctness, exactness, accuracy, precision, trustworthiness, error or mistake-free, conformity to a standard or model, or according to other suitable measure of being valid) of the final output document. Maintaining a standard measure of quality is important when providing trusted data. Evaluating the quality of data and trusting the data source requires a system of quality control that often involves a multi-stage evaluation process to determine whether data from a source A, e.g., a temporary employee performing data entry, is any more or less valid than data automatically retrieved from another source B, e.g., a bank.

SUMMARY

In general, in one aspect, a method for managing trust level of a collection of information having a first input data and a derived data comprises obtaining the first input data from a data source, generating the derived data from at least the first input data, determining a derived trust level of the derived data from at least a first input trust level based on the data source, and indicating validity of the derived data based on the derived trust level.

In general, in one aspect, a data structure for managing trust level of a collection of information having a first input data and a derived data comprise an ordered graph structure comprising a first node corresponding to the first input data, a second node corresponding to the derived data, and a first edge connecting the first node and the second node, wherein the second node is a parent node of the first node, wherein a derived trust level of the derived data is determined from at least a first input trust level of the first input data according to a weight associated with the first edge, wherein the derived data is generated from at least the first input data according to a first relationship and the weight associated with the first edge is determined based on the first relationship, and wherein the first input data is obtained from a data source and the first input trust level is determined based on a trust level of the data source.

In general, in one aspect, a graphical user interface for managing trust level of a collection of information in a software application comprises a first input data field for displaying a first input data, wherein the first input data is associated with a first input trust level for indicating validity of the first input data, and a first annotation for annotating the first input data field based on the first input trust level.

In general, in one aspect, a computer readable medium, embodying instructions executable by the computer to perform method steps for managing trust level of a collection of information a first input data and a derived data, the instructions comprising functionality to obtain the first input data from a data source, generate the derived data from at least the first input data, determine a derived trust level of the derived data from a first input trust level based on the data source, and indicate validity of the derived data based on the derived trust level.

Other aspects and advantages of the invention will be apparent from the following description and the appended claims.

BRIEF DESCRIPTION OF DRAWINGS

FIGS. 1-3 show examples of a graphical user interface in accordance with aspects of the present invention.

DETAILED DESCRIPTION

Figure 2:
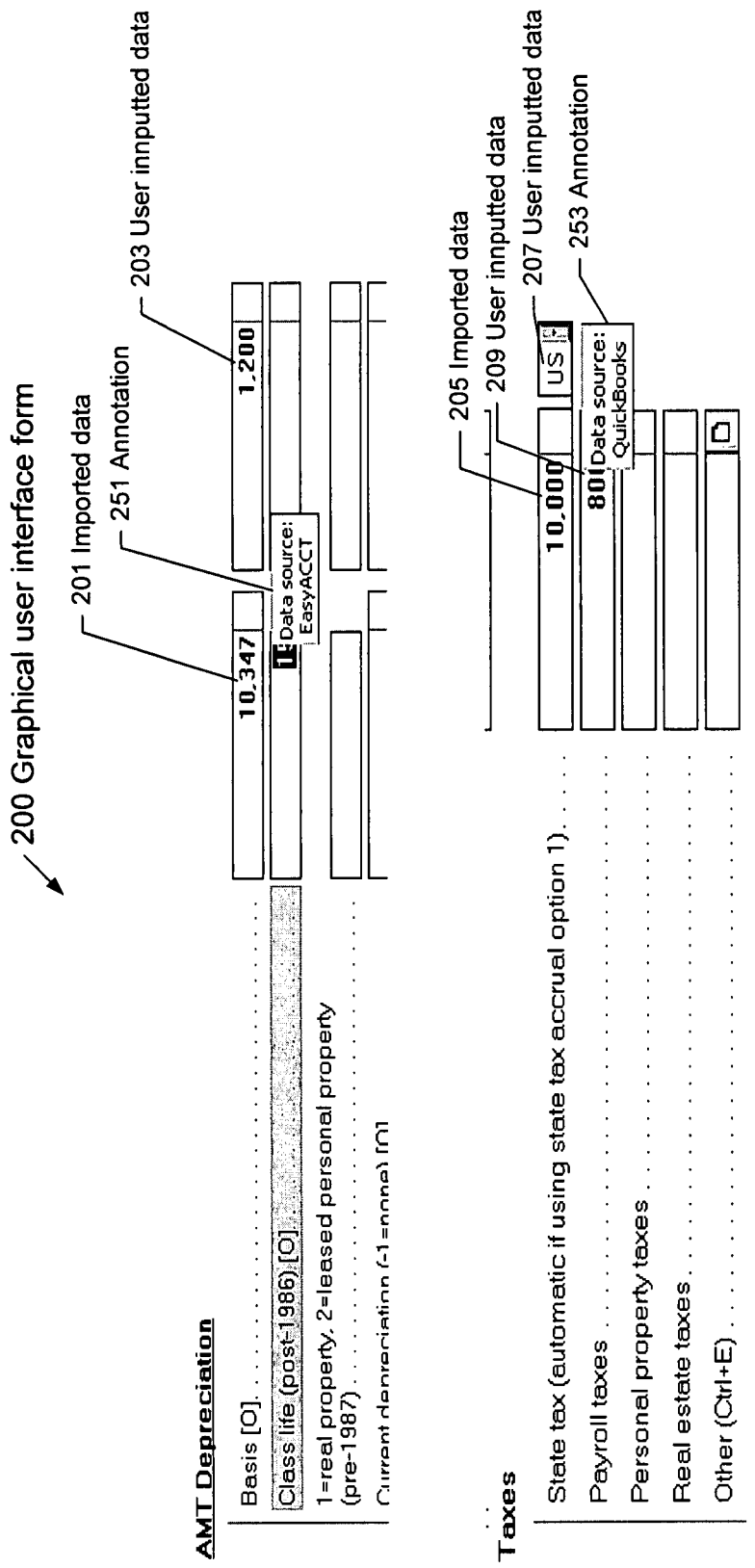

Specific embodiments of the invention will now be described in detail with reference to the accompanying figures. Like elements in the various figures are denoted by like reference numerals for consistency.

In examples of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, in one aspect, the invention relates to a system, or mechanism, for defining various input sources, determining the default level of trust for those sources, and indicating the trust level associated with a resultant field in a software application. Specifically, the trust level associated with the resultant field may be indicated using visual cues based on the various data sources from which the resultant field is generated and the configured trust levels of those data sources.

In general, in one aspect, the invention relates to a system, or mechanism, that provides a review mechanism in a software application which prioritizes review activities based on the trust levels associated with various data fields and steps reviewers through the review workflow, maintaining status and net progress. Specifically, visual cues indicating the trust levels associated with various data fields may be expanded to show additional information, e.g., information relating to a trust structure from which the trust level may be derived. Moreover, the reviewer may be able to confirm a data field, e.g., a data field showing low trust level, and annotate the confirmation.

FIG. 1 shows an example of a graphical user interface for software in accordance with aspects of the present invention. Specifically, FIG. 1 shows a graphical user interface form (100) of tax preparation software as seen from a reviewer's view. While the graphical user interface is directed to financial software (i.e., tax preparation software), the invention should not be limited in scope to this embodiment. Any software that uses forms containing data may benefit from the present invention.

Continuing with FIG. 1, the form (100) includes data fields (e.g., input data (101), derived data (103), derived data (105), input data (107), input data (109, derived data (111)) corresponding to lines 1-6 of the form (100). Input data (101) represents a balance of "Gross receipts or sales less returns and allowances," which may be derived from two other intermediate data fields contained in line 1 of the form. Derived data (103) represents "Cost of goods sold (Schedule A, line 8)." For example, derived data field (103) may be entered by a person using a number read off line 8 of another form "Schedule A." In another example, the form "Schedule A" may be included in the tax preparation software and derived data (103) may be derived from the form "Schedule A." Derived data (105) represents "Gross profit. Subtract line 2 from line 1c," which contains a data derived from the input data (101) and derived data (103). Input data (107) represents "Net gain (loss) from Form 4797, Part II, line 17 (attach Form 4797)." For example, input data (107) may be entered by a person using a number read off Part II, line 17 of another form "Form 4797". In another example, the input data (107) may be automatically imported or derived. Input data (109) represents "Other income (loss) (attach statement)." For example, input data (109) may be entered by a person using a number from an attached statement. In another example, the statement may be an output from another software application and input data (109) may be automatically imported. Derived data (111) represents "Total income (loss). Add lines 3 through 5," which contains a data derived from the derived data (105), input data (107), and input data (109).

Derived data (103), derived data (105), input data (107), and derived data (111) are shown with a check mark annotated by the reviewer. The check mark is a mechanism provided by the tax preparation software for the reviewer to confirm the data field. As described above, input data (101), derived data (103), input data (107), and input data (109) may be entered by a person, derived by the tax preparation software, or imported from another form or software. For the reviewer to confirm these data fields, the reviewer must have an understanding of the experience and/or quality level of the person performing the data entry and/or the quality of the data imported from the other form or software. Therefore, the reviewer needs an indication of trust levels of the corresponding data sources. For the reviewer to confirm derived data (105) and derived data (111) based on varying trust levels of the corresponding input data gathered from various data sources, the reviewer must be able to determine a representation of the relationship of how the derived data is derived from the respective data sources.

FIG. 2 shows an example of a graphical user interface for software in accordance with aspects of the present invention. Specifically, the software shown here is tax preparation software. The exemplary graphical user interface form (200) includes data fields (imported data (201), user inputted data (203), imported data (205), user inputted data (207), user inputted data (209)) and annotation (251) and annotation (253). Imported data (201) represents an imported depreciation base corresponding to "Basis [O]" and contains a number "10,347" displayed in black. User inputted data (203) represents a user inputted depreciation base corresponding to "Basis [O]" and contains a number "1,200" displayed in blue. Imported data (205) represents "State tax" and contains a number "10,000" displayed in black. User inputted data (207) represents a country corresponding to "State tax" and contains "US" displayed in blue. User inputted data (209) represents a depreciation base "Payroll taxes" and contains a number "800" displayed in blue. The annotation (251) displays "Data source: EasyACCT," which indicates a data source of data contained in imported data (201). The annotation (253) displays "Data source: QuickBooks," which indicates a data source of data contained in data field (205).

In this example, the color of the data contained in a data field indicates the data source from which the data is collected. For example, the color black indicates that the data is imported from other software and the color blue indicates that the data is user inputted. In other examples, different colors may be used. In another example, other highlighting attributes, or display formats may be used instead of color, e.g. font style, font size, font type, underline, upper/lower case, etc. Moreover, other annotation schemes may be used for indicating the data source. For example, an icon or a message window may be displayed adjacent to the corresponding data field. In another example, the icon or message window may pop up based on an annotation control such as a mouse click or a mouse over. For example, annotation (251) and annotation (253) may be pop up message windows displaying the names of the software from which the corresponding data fields collected the data. In another example, annotation (251) and annotation (253) may pop up responding to a mouse click at or a mouse over the corresponding imported data (201) and imported data (205). In yet another example, the annotation (251) and annotation (253) may be displayed statically and may be configured to be turned on or off based on the annotation control. In still another example, annotation (251) and annotation (253) may be expanded to display additional information, e.g., information relating to the data source or trust level, responding to the annotation control. For example, additional information relating to how data contained in a data field is derived if the data is not user inputted or imported from another software application. In some examples, the type or scheme for annotation and annotation control may be user configurable.

FIG. 3 shows another example of a graphical user interface for software in accordance with aspects of the present invention. Specifically, the software shown here is tax preparation software. The exemplary graphical user interface may include a graphical user interface form (300) and may represent a reviewer's view. The form (300) may include annotations ("semi-trusted" annotation (301), "untrusted" annotation (302), "untrusted" annotation (303), "trusted" annotation (305), "semi-trusted" annotation (307), "trusted" annotation (309), "semi-trusted" annotation (311), "trusted" annotation (313), "semi-trusted" annotation (315), "untrusted" annotation (317)) each corresponding to an adjacent data field. The form (300) may also include multiple data fields, such as data fields (derived data (319), derived data (321), input data (323), derived data (325)), among others.

For example, data (319), corresponding to the annotation (307), may be derived from the other fields corresponding to line 1c and line 2 of the form (300), the data (321), may be derived from another form 4797 of the software, which may include multiple forms similar to the form (300), the data (323), corresponding to the annotation (309), may be inputted by user, and the data (325), corresponding to the annotation (311), may be derived from the data (319), data (321), and data (323). As an example, the data (321) may have a corresponding annotation configured to be turned off by the user.

As shown in FIG. 3, the annotations are statically displayed as a graphical icon. Annotation (305), annotation (309), and annotation (313) contain a check mark icon in green. Annotation (301), annotation (307), annotation (311), and annotation (315) contain a question mark icon in blue. Annotation (302), annotation (303), and annotation (317) contain a cross mark icon in red. For example, the check mark icon may indicate a trust level "trusted," the question mark icon may indicate a trust level "semi-trusted," and a cross mark icon may indicate a trust level "un-trusted." In addition, the trust levels may be further annotated in different colors.

In one or more embodiments of the invention, more trust levels may exist, e.g. there may be more than three trust levels in software or less than three trust levels in another software application. In some examples, the trust levels may be optionally expanded into more levels or consolidated into fewer levels. For example, the optional expansion or consolidation of trust levels may be user configurable for each software application. In another example, the software may have a default number of trust levels and may automatically expand or consolidate if a data source presents different number of trust levels. For example, the default number of trust levels may be reconfigured by a user, e.g., a reviewer. In some examples, the statically displayed icon, as shown in FIG. 3, may be combined with an annotation control that may expand the icon with a message window for displaying additional information relating to the trust level of a corresponding data field. For example, a portion of a trust structure relating to the data field, as described in detail in reference to FIG. 4 below, may be displayed according to the annotation control. Moreover, the reviewer may review and confirm a data field and annotate the confirmation with a check mark next to the data field, e.g., the check mark next to the data (319) and data (321).

Figure 4:
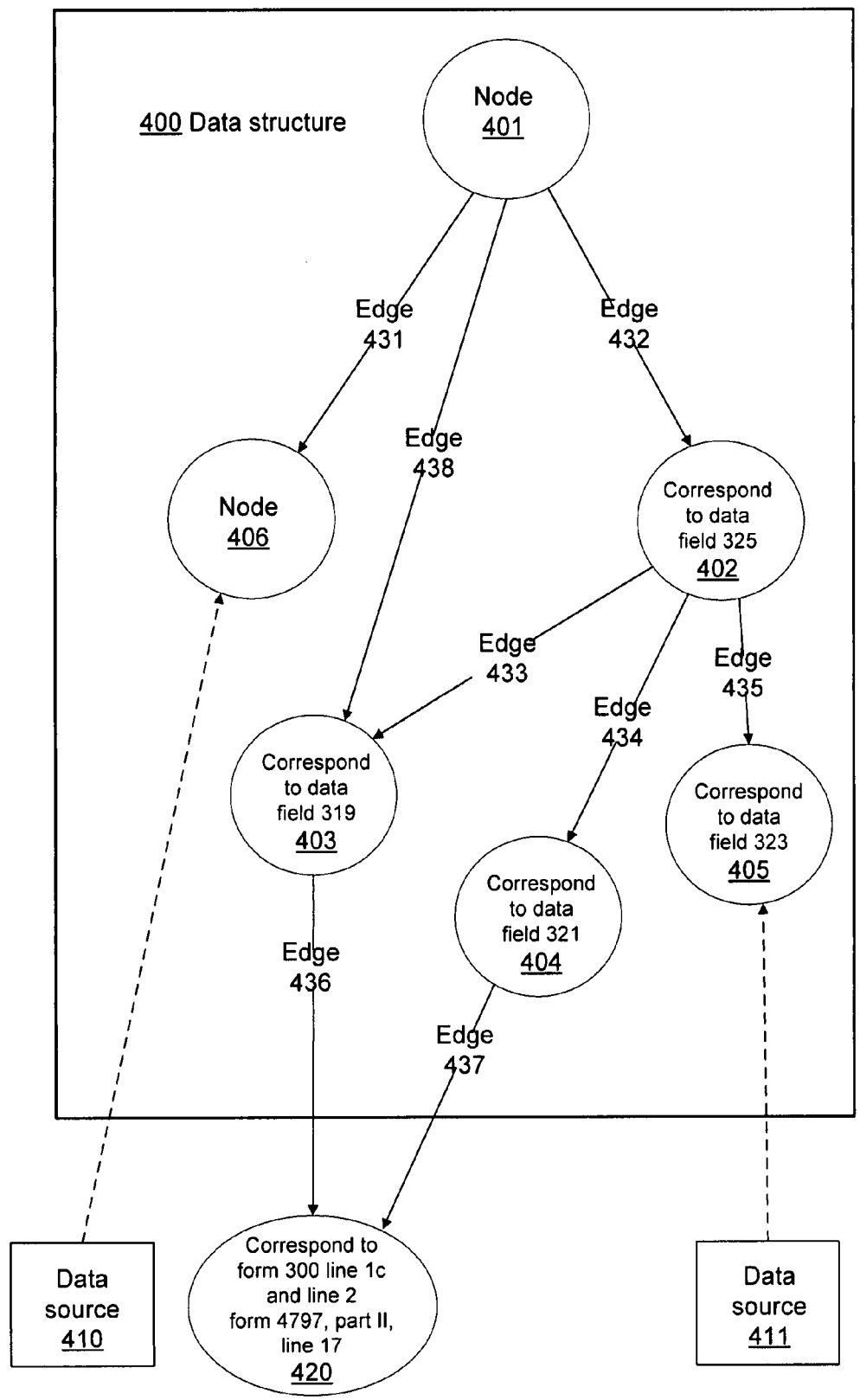
FIG. 4 shows a data structure for representing trust levels of data in accordance with aspects of the present invention.

FIG. 4 shows a data structure for representing trust levels of data in accordance with on or more embodiments of the invention. The data structure (400) is shown as an ordered graph structure and may be referred to as a trust structure of the financial data. As known to those skilled in the art, the ordered graph structure is a widely used data structure in computer science that includes a set of nodes connected using edges. Each node has zero or more child nodes, which is typically shown below the node with an arrow pointed from the node to each child node.

A node that has a child is called the child's parent node. A node may have more than one parent. The parents of a node are the nodes connected to the node and precede the node in the ordering. The arrow connecting from a parent node to a child node represents the ordering. A node at the bottom most level is called a leaf node and has no children. An inner node is a node that has child nodes and is, thus, not a leaf node. Each node may correspond to a data field of the financial data, which may include multiple data fields. Each edge connecting two nodes may represent a relationship between two corresponding data fields. Each data field may contain data with an associated trust level.

As shown in FIG. 4, the data structure (400) includes inner nodes (401-404) and leaf node (405) and leaf node (406). In addition, leaf node (405) and leaf node (406) are associated with data source (411) and data source (410), respectively. These associations represent that the data fields corresponding to leaf node (405) and leaf node (406) may collect data from the corresponding data sources through input of a user or by importing from another software application.

The trust levels corresponding to the leaf nodes may be defined by, e.g., set equal to, the trust levels of the user or the other software, respectively. Further, node (403) and node (404) are shown to be parents of another data structure (420) which may include one or more ordered graph structures representing separate portion(s) of the financial data. Although each leaf node is shown to be associated with only one data source in this example, the association may be different in other examples depending on the specific profile of the financial data and how data fields corresponding to leaf nodes may collect data from one or more data source(s). For example, one leaf node may be associated with more than one data source. In another example, more than one leaf nodes may be associated with one data source.

Continuing with the discussion of FIG. 4, in accordance with one or more embodiments of the invention, the financial data may be associated with tax preparation software such as described in reference to FIG. 3 above. The tax preparation software may include a generation engine or a calculation engine, which is employed for generating or calculating each of the multiple data fields of the software. In general, the ordered graph structure may be composed according to the calculation engine. For example, each node of the ordered graph may correspond to a data field of the tax preparation software. Each edge connecting two nodes may represent a relationship between two corresponding data fields (e.g., the relationship according to how the data field corresponding to the parent node is derived from the other data field corresponding to the child node).

For example, the inner node (403) is shown to have two parents (i.e., node (401) and node (402)), which indicates that the data field corresponding to node (403) may be used in calculating both data fields corresponding to node (401) and node (402), respectively. In another example referring to both FIGS. 3 and 4, node (402) may correspond to data (325), node (403) may correspond to data (319), node (404) may correspond to data (321), and node (405) may correspond to data (323), respectively. Accordingly, the data structure (400) may represent the trust structure associated with data (319), data (321), data (323), and data (325).

Moreover, the data structure (420) may supplement the data structure (400) to represent the trust structure associated with data (319) and data corresponding to line 1c and line 2 of the form (300), as described in reference to FIG. 3 above. Referring back to FIG. 3, the data field (325) represents "Total income," which is derived by the calculation engine adding the data contained in the data (319), data (321), and data (323) in equal proportion. As such, edge (433), edge (434), and edge (435) represent a one-third contribution to parent node (402), which corresponds to the derived data (325).

In one or more embodiments of the invention, "un-trusted," represented by the cross mark icon, may correspond to a value greater or equal to 0 but less than 1, "semi-trusted," represented by the question mark icon, may correspond to a value greater or equal to 1 but less than 2, and "trusted," represented by the check mark icon, may correspond to a value greater or equal to 2 but less than or equal to 3. In this example, node (319) may correspond to a trust level with a value of 2, node (323) may correspond to a trust level with a value of 3, node (321) may correspond to a trust level with a value of 0, and edge (433), edge (434), and edge (435) may be assigned a contribution value of one-third. Accordingly, the derived trust level associated with data (325) may be generated (based on the data structure (400)) by adding the trust levels corresponding to its child nodes each weighted by the contribution value assigned to the edge connecting the child node. Using simple math yields a value rounding to 1.7, which corresponds to trust level "semi-trusted" represented by the icon question mark, as shown in FIG. 3.

In other examples, a resultant data field may be derived from multiple data fields with unequal proportions, therefore the contribution value assigned to an edge connecting two nodes may be any value between 0 and 100 percent. In general, the contribution values of all edges from all child nodes connected to a parent node should add up to 100 percent, so that the total contribution from the trust levels corresponding to all the child nodes is normalized.

In general, a trust level associated with a data field corresponding to an inner node may be derived by first reducing the ordered graph structure to a tree structure. Only nodes and edges converging to the inner node of interest need to remain in the tree structure and the trust level may be derived according to the example above.

Figure 5:
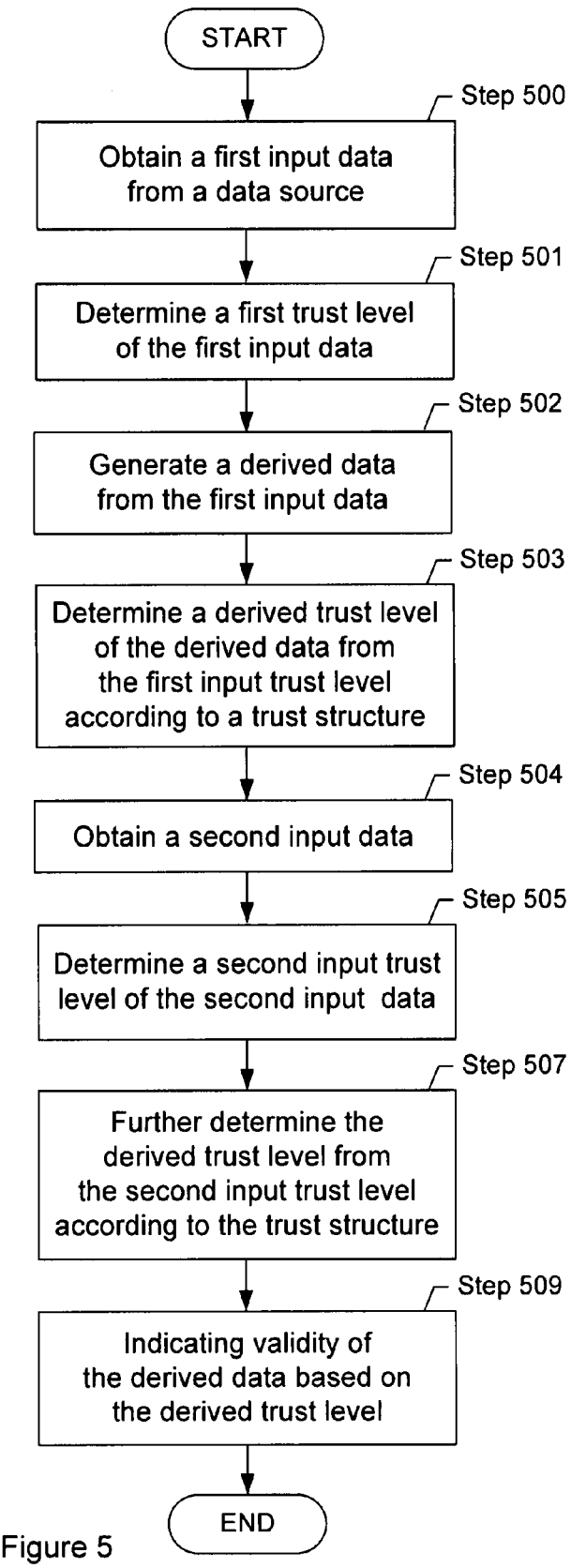
FIG. 5 shows a flow chart of a method for indicating and resolving trust levels of data in accordance with aspects of the present invention.

FIG. 5 shows a flow chart of a method for indicating and resolving trust levels of data in accordance with aspects of the present invention. The method described in FIG. 5 may be applied to software such as the tax preparation software described in reference to FIG. 3 above. Alternatively, the method described in FIG. 5 may also be applied to a software application in other subject areas, such as project planning, resource management, medicine, or any other subject area where trust levels may be useful. Moreover, the method described in FIG. 5 may use a trust structure such as the data structure described in reference to FIG. 4 above. Alternatively, other suitable data structures may also be used.

FIG. 5 shows initially, a first input data is obtained from a data source (Step 500). The first input data may be inputted by a user or imported from another software application, as described above.

A first trust level of the first input data is then determined (Step 501). The first input trust level may be determined from a source trust level of the data source. The source trust level may indicate the validity (e.g., correct, exact, accurate, precise, proper, trust-worthy, free of mistake or error, conforming to a standard or model, or according to other suitable measure of being valid) of the data source. Referring to both FIGS. 3 and 4, for example, the trust level of data contained in data (323), corresponding to node (405), may be determined to be equal to trust level of a data entry clerk, corresponding to data source (411). In another example, the trust level of data contained in data (323) may be determined according to trust level of another software application, corresponding to data source (411), from which the data is imported for data (323). In still another example, trust level of data contained in Form 4797, Part II, line 17, from which data (321) may collect data, may correspond to a node within the data structure (420) and may be determined according to a trust structure represented by the data structure (420). In yet still another example, the source trust level may be pre-configured based on the data source and the input trust level is based on the data source.

Next, continuing with FIG. 5, derived data may be generated from the first input data (Step 502). The generation of derived data may be performed using a generation engine or a calculation engine of financial software that has the functionality to generate the financial data. The generation engine or the calculation engine may include functionality to generate or calculate a result based on mathematical or logical operations.

A derived trust level of the derived data may then be determined from that of the first input data according to a trust structure (Step 503). Referring to both FIGS. 3 and 4, for example, trust level of data contained in data (321), corresponding to node (404), may be set equal to trust level corresponding to the node within the data structure (420) corresponding to Form 4797, Part II, line 17 and weighted by a contribution value assigned to edge (437). The contribution level assigned to edge (437) may be set to 100 percent considering that node (404) may have only one child node and that the calculation engine may calculate data (321) as equal to the data field corresponding to Form 4797, Part II, line 17. In another example, trust level corresponding to node (402) may be determined, at least in part, according to trust level corresponding to node (404) weighted by a contribution value assigned to edge (434). The contribution value assigned to edge (434) may be set to one-third considering that the calculation engine may calculate data (325) as the sum of data (319), data (321), and data (323) with equal proportion as described in reference to FIG. 3 above.

Next, a second input data is obtained (Step 504). The second input data may be obtained from another data source or derived from another portion of the financial software.

A second input trust level of the second input data may then be determined accordingly (Step 505). Referring back to FIGS. 3 and 4 above, for example, the data structure (420) may supplement the data structure (400) to represent trust structure associated with data (319) and data corresponding to line 1c and line 2 of the form (300), as described in reference to FIG. 3 above. Accordingly, the trust level associated with data (319), corresponding to node (403), may be determined based on the trust structure represented by the combination of data structure (400) and data structure (420).

Next, trust level of the derived data is further determined from the second input trust level according to the trust structure (400) (Step 507). Referring back to FIGS. 3 and 4 above, for example, trust level associated with data (325) may be further determined, at least in part, according to trust level associated with data (319) weighted by a contribution value assigned to edge (433). The contribution value assigned to edge (433) may be set to one-third considering that the calculation engine may calculate data (325) as the sum of data (319), data (321), and data (323) with equal proportion, as described in reference to FIG. 3 above.

Next, trust level of the derived data is provided for indicating validity (e.g., correct, exact, accurate, precise, proper, trust-worthy, free of mistake or error, conforming to a standard or model, or according to other suitable measure of being valid) of the derived data (Step 509).

Referring back to FIGS. 3 and 4 above, for example, a graphical icon (311) may be displayed according to trust level associated with data (325), as described in reference to FIG. 3 above. In another example, the trust structure represented by the data structure (400) or a reduced portion of the data structure (400), e.g., a tree structure with node (402) as the root may be displayed in a pop up window in response to a mouse click or mouse over similar to the way described in reference to FIG. 2 above. In still another example, additional information such as the name of, or the code representing, the data entry clerk or the other software corresponding to data source (411) may also be displayed, e.g., along with the data structure (400), in the pop up window.

A reviewer may use these displayed information to prioritize review workflow and focus on higher risk area, e.g., data field (319), indicated by a lower trust level, e.g., annotation (307) with the question mark. For example, the reviewer may confirm the data with lower trust level, e.g., data field (319), by reviewing and confirming the validity (e.g., correct, exact, accurate, precise, proper, trust-worthy, free of mistake or error, conforming to a standard or model, or according to other suitable measure of being valid) of data relating to a relevant portion of the trust structure. In another example, the reviewer may further annotate the confirmation of a data field using a check mark, e.g., the check mark adjacent to data (319), as described in reference to FIG. 3 above. In still another example, the confirmation by the reviewer may supersede and substitute the trust level represented in the data structure. In yet another example, the modification of trust level in the data structure according to reviewer confirmation may be optional or configurable by a user, such as the reviewer user.

In one or more embodiments of the invention, a mechanism may be provided for indicating and resolving the trust level of information in a software application inputted by a person or imported from another software application. The trust level may be used for review and validation of final output of the software application. Annotations and visual cues may be provided in the software application to prioritize or focus the review activities based on the trust level of various data field in multiple forms of the software application. The mechanism may be standardized within a group or community of users sharing the trust level specification. The software application may include financial software and software application in other subject areas, such as project planning, resource management, medicine, inventory management, business operation (strategic planning, sales forecasting, distribution channel management, and the like) management or any other subject area where trust levels provide utility.

Figure 6:
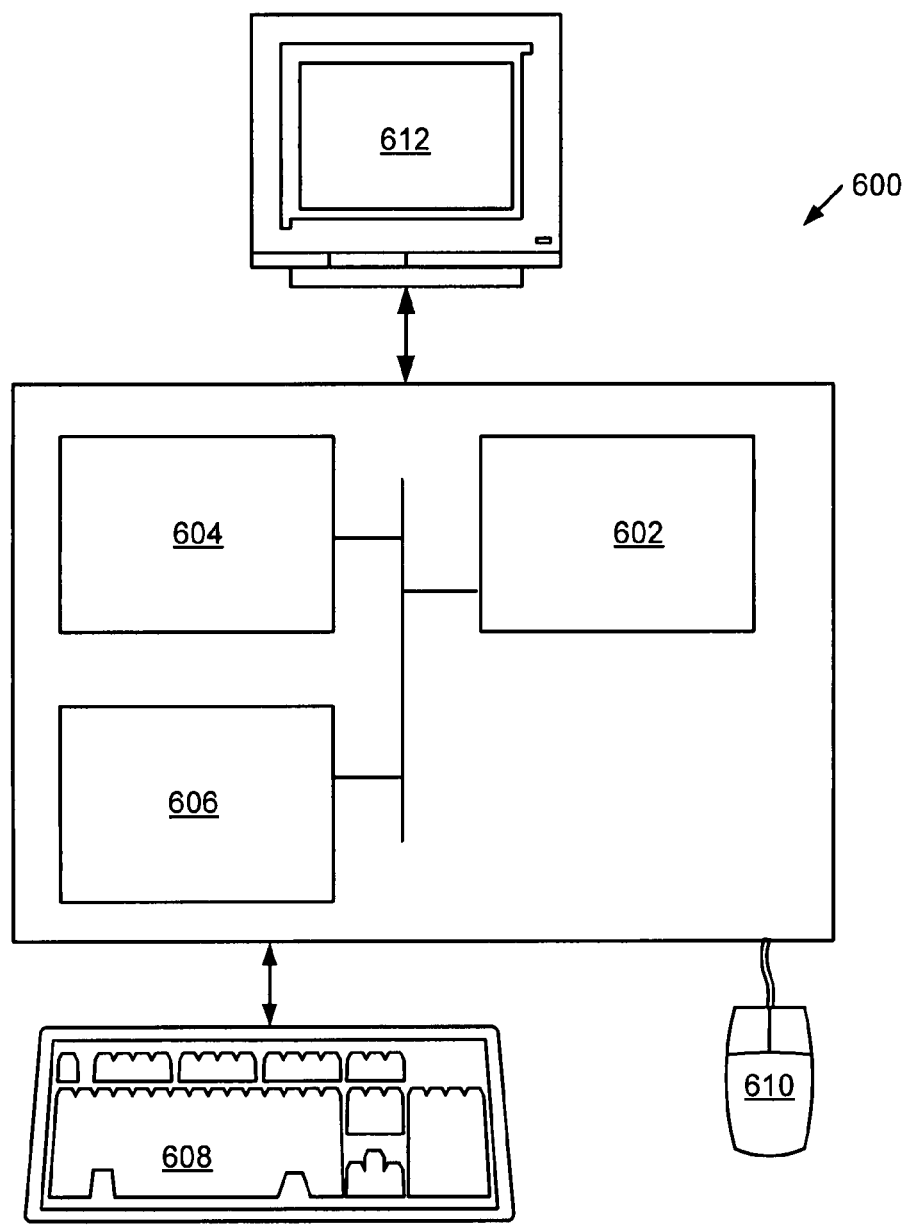
FIG. 6 shows a computer system in accordance with an embodiment of the present invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for managing trust level of a collection of information having a first calculation data and a second calculation data, comprising:
   obtaining, using a processor of a computer system, the first calculation data from a data source;
   calculating, using the processor, the second calculation data from at least the first calculation data according to a first relationship of a calculation engine;
   determining, using the processor and based on a trust structure, a second trust level of the second calculation data from at least a first trust level based on the data source; and
   indicating validity of the second calculation data based on the derived second trust level,
   wherein the trust structure comprises an ordered graph structure comprising:
      a first node corresponding to the first calculation data,
      a second node corresponding to the second calculation data, and
      a first edge connecting the first node and the second node, wherein the second node is a parent node of the first node,
   wherein the second trust level is determined from the first trust level according to a weight associated with the first edge, and
   wherein the weight associated with the first edge relates to how the second calculation data is calculated from the first calculation data and is determined from the first relationship of the calculation engine.

2. The method of claim 1, wherein the collection of information comprises at least one selected from the group consisting of financial information, medical information, inventory information, business operation information, sales forecasting information, and distribution channel management information.

3. The method of claim 1, further comprising:
   displaying the first trust level for indicating validity of the first calculation data; and
   displaying the second trust level for indicating validity of the second calculation data.

4. The method of claim 1, wherein the collection of information comprises a third calculation data, the method further comprising:
   determining a third trust level of the third calculation data;
   further calculating the second calculation data from at least the third calculation data according to a second relationship of the calculation engine; and
   further determining the second trust level from at least the third trust level according to a weight associated with a second edge of the trust structure,
   wherein the trust structure further comprises a third node corresponding to the third calculation data and the second edge connecting the second node and the third node, wherein the second node is a parent node of the third node,
   wherein the weight associated with the second edge relates to how the second calculation data is calculated from the third calculation data and is determined based on the second relationship of the calculation engine, and
   wherein the weight associated with the first edge and the weight associated with the second edge are normalized for the second node.

5. The method of claim 4, further comprising:
    displaying the first trust level and the third trust level for indicating validity of the first calculation data and the third calculation data;
    reviewing the first trust level and the third trust level for confirming the validity of the second calculation data; and
    modifying the second trust level according to confirmation of the second calculation data.

6. A method for managing trust level of a collection of information having a first calculation data and a second calculation data, comprising:
    generating an ordered graph structure associated with a calculation engine of a financial software product (FSP), wherein the second calculation data is calculated from at least the first calculation data, within the FSP, using the calculation engine according to a first relationship of the calculation engine, wherein the ordered graph structure comprises a first node corresponding to the first calculation data, a second node corresponding to the second calculation data, and a first edge connecting the first node and the second node, wherein the second node is a parent node of the first node; and
    determining, using a processor of a computer system, a second trust level of the second calculation data from at least a first trust level of the first calculation data according to a weight associated with the first edge,
    wherein the weight associated with the first edge relates to how the second calculation data is calculated from the first calculation data and is determined based on the first relationship of the calculation engine, and
    wherein the first calculation data is obtained from a data source and the first trust level is determined based on a trust level of the data source.

7. The method of claim 6, wherein the collection of information comprises financial information.

8. The method of claim 6, wherein the collection of information further comprises a third calculation data, and wherein the second calculation data is further generated from the third calculation data according to a second relationship of the calculation engine, the ordered graph structure further comprising:
    a third node corresponding to the third calculation data; and
    a second edge connecting the second node and the third node, wherein the second node is a parent node of the third node;
    wherein the second trust level is further determined from at least a third trust level of the third calculation data according to a weight associated with the second edge;
    wherein the weight associated with the second edge relates to how the second calculation data is calculated from the third calculation data and is determined based on the second relationship of the calculation engine; and
    wherein the weight associated with the first edge and the weight associated with the second edge are normalized for the second node.

9. A system for managing trust level of a collection of information having a first calculation data, a second calculation data, and a third calculation data, comprising:
    a processor;
    memory storing instructions when executed by the processor comprise functionality for:
        obtaining the first calculation data from a data source;
        calculating the second calculation data from at least the first calculation data according to a first relationship of a calculation engine;
        determining, based on a trust structure, a second trust level of the second calculation data from at least a first trust level based on the data source; and
        modifying the second trust level according to user confirmation of validity of the second calculation data,
            wherein the trust structure comprises an ordered graph structure comprising:
                a first node corresponding to the first calculation data,
                a second node corresponding to the second calculation data, and
                a first edge connecting the first node and the second node, wherein the second node is a parent of the first node,
            wherein the second trust level is determined from the first trust level according to a weight associated with the first edge, and
            wherein the weight associated with the first edge relates to how the second calculation data is calculated from the first calculation data and is determined from the first relationship of the calculation engine;
        determining a third trust level of the third calculation data;
        further calculating the second calculation data from at least the third calculation data according to a second relationship of the calculation engine; and
        further determining the second trust level from at least the third trust level according to a weight associated with a second edge of the trust structure,
            wherein the ordered graph of the trust structure further comprises a third node corresponding to the third calculation data and the second edge connecting the second node and the third node, wherein the second node is a parent node of the third node,
            wherein the weight associated with the second edge relates to how the second calculation data is calculated from the third calculation data and is determined based on the second relationship of the calculation engine, and
            wherein the weight associated with the first edge and the weight associated with the second edge are normalized for the second node; and
    a display device operatively coupled to the processor and configured to display a graphical user interface comprising:
        a first calculation data field for displaying the first calculation data;
        a first annotation for annotating the first calculation data based on the first trust level field to indicate validity of the first calculation data;
        a second calculation data field for displaying the second calculation data;
        a second annotation for annotating the second calculation data based on the second trust level field to indicate validity of the second calculation data;
        a third calculation data field for displaying the third calculation data;
        a third annotation for annotating the third calculation data field based on the third trust level to indicate validity of the third calculation data; and
        a user input field for receiving the user confirmation of the validity of the second calculation data.

10. The system of claim 9, wherein the collection of information comprises financial information.

11. The system of claim 9, wherein the first trust level is one selected from a group consisting of un-trusted, semi-trusted, and trusted.

12. The system of claim 9, wherein the first annotation comprises a display format of the first calculation data field, wherein different display formats represents different levels of the first input trust level.

13. The system of claim 9, wherein the first annotation comprises an icon displayed adjacent to the first calculation data field, wherein different display icons represents different levels of the first input trust level.

14. The system of claim 9, wherein the first annotation comprises a message window.

15. The system of claim 14, wherein the message window comprises a pop-up message window.

16. The system of claim 9, further comprising: an annotation control for controlling the first annotation.

17. The system of claim 16, wherein the annotation control comprises a mouse click to the first annotation.

18. The system of claim 16, wherein the annotation control comprises a mouse over to the first annotation.

19. The system of claim 16, wherein the first annotation is displayed in response to the annotation control.

20. The system of claim 16, wherein the first annotation is expanded to display additional information in response to the annotation control.

21. The system of claim 9, wherein the first trust level is determined based on a trust level of the data source.

22. The system of claim 21, wherein the first annotation comprises information associated with the data source.

23. The system of claim 21, wherein the data source comprises a data source of user inputted data and the trust level of the data source is determined based on a user inputting the user inputted data, wherein the first annotation comprises a name of the person.

24. The system of claim 21, wherein the data source comprises a data source of imported data and the trust level of the data source is determined based on a financial application providing the imported data, wherein the first annotation comprises a name of the financial application.

25. The system of claim 9, wherein the graphical user interface further comprises:
an annotation control for controlling one selected from a group consisting of the first annotation and the second annotation to display information associated with one selected from a group consisting of the first trust level and the second trust level.

26. The system of claim 25, wherein the annotation control comprises a navigation control for navigating the trust structure to select a portion of the trust structure, and wherein the annotation control controls one selected from a group consisting of the first annotation and the second annotation to display the portion of the trust structure.

27. A non-transitory computer readable storage medium, embodying instructions executable by the computer to perform method steps for managing trust level of a collection of information a first calculation data and a second calculation data, the instructions comprising functionality to:
obtain the first calculation data from a data source;
calculate the second calculation data from the first calculation data according to a first relationship of a calculation engine;
determine, based on a trust structure, a second trust level of the second calculation data from at least a first trust level based on the data source; and
indicate validity of the second calculation data based on the second trust level,
wherein the trust structure comprises an ordered graph structure comprising:
a first node corresponding to the first calculation data,
a second node corresponding to the second calculation data, and
a first edge connecting the first node and the second node, wherein the second node is a parent node of the first node,
wherein the second trust level is determined from the first trust level according to a weight associated with the first edge, and
wherein the weight associated with the first edge relates to how the second calculation data is calculated from the first calculation data and is determined from the first relationship of the calculation engine.

28. The non-transitory computer readable storage medium of claim 27, wherein the instructions further comprise functionality to:
display the first trust level for indicating validity of the first calculation data; and
display the second trust level for indicating validity of the second calculation data.

29. The non-transitory computer readable storage medium of claim 27, wherein the collection of information comprises a third calculation data and the instructions further comprise functionality to:
determine a third trust level of the third calculation data;
further calculate the second calculation data from at least the third calculation data according to a second relationship of the calculation engine; and
further determine the second trust level from at least the third trust level according to a weight associated with a second edge of the trust structure,
wherein the trust structure further comprises a third node corresponding to the third calculation data and the second edge connecting the second node and the third node, wherein the second node is a parent node of the third node,
wherein the weight associated with the second edge relates to how the second calculation data is calculated from the third calculation data and is determined based on the second relationship of the calculation engine, and
wherein the weight associated with the first edge and the weight associated with the second edge are normalized for the second node.

30. The non-transitory computer readable storage medium of claim 29, wherein the instructions further comprise functionality to:
display the first trust level and the third trust level for indicating validity of the first calculation data and the third calculation data;
review the first trust level and the third trust level for confirming the validity of the second calculation data; and
modify the second trust level according to confirmation of the second calculation data.

* * * * *

UNITED STATES PATENT AND TRADEMARK OFFICE
CERTIFICATE OF CORRECTION

Page 1 of 1

PATENT NO. : 7,899,757 B1
APPLICATION NO. : 11/700580
DATED : March 1, 2011
INVENTOR(S) : Talan et al.

It is certified that error appears in the above-identified patent and that said Letters Patent is hereby corrected as shown below:

In Claim 1, Column 10 (line 19) "derived" should be deleted.

In Claim 9, Column 12 (line 14) --node-- should be added after the word "parent".

Signed and Sealed this
Third Day of May, 2011

David J. Kappos
*Director of the United States Patent and Trademark Office*